(12) United States Patent
Xie et al.

(10) Patent No.: US 12,494,532 B1
(45) Date of Patent: Dec. 9, 2025

(54) HONEYCOMB-IMMERSED HEATING AND COOLING INTEGRATED BATTERY SYSTEM AND THERMAL MANAGEMENT METHOD THEREOF

(71) Applicant: Beijing Institute of Technology, Beijing (CN)

(72) Inventors: Peng Xie, Beijing (CN); Cheng Lin, Beijing (CN); Shenghao Li, Beijing (CN); Zhenyi Tao, Beijing (CN); Yuanqing Cao, Beijing (CN); Xiyao Duan, Beijing (CN); Yu Tian, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 19/185,300

(22) Filed: Apr. 22, 2025

(30) Foreign Application Priority Data

Jun. 7, 2024 (CN) .......................... 202410735622.2

(51) Int. Cl.
*H01M 50/112* (2021.01)
*H01M 10/48* (2006.01)
(Continued)

(52) U.S. Cl.
CPC ....... *H01M 50/112* (2021.01); *H01M 10/482* (2013.01); *H01M 10/486* (2013.01); *H01M 10/617* (2015.04); *H01M 10/633* (2015.04); *H01M 10/6568* (2015.04); *H01M 10/658* (2015.04); *H01M 50/152* (2021.01); *H01M 50/162* (2021.01)

(58) Field of Classification Search
CPC ............. H01M 50/112; H01M 10/482; H01M 10/486; H01M 10/617; H01M 10/633;
(Continued)

(56) References Cited

FOREIGN PATENT DOCUMENTS

| CN | 106921006 | * | 7/2017 |
| CN | 210607540 U | | 5/2020 |

(Continued)

OTHER PUBLICATIONS

Chinese Patent No. 114094226A, Issued Feb. 25, 2022 to Du et al., English translation, pp. 1-16.
(Continued)

*Primary Examiner* — Lisa S Park
(74) *Attorney, Agent, or Firm* — Addison D. Ault; IPGentleman Intellectual Property Services, LLC

(57) ABSTRACT

A honeycomb-immersed heating and cooling integrated battery system includes a box with a top cover, multiple matrix arranged cells, a honeycomb structure, an upper cover plate, a lower cover plate and a coolant circulation component, where the honeycomb structure has multiple hexagonal close-packed special-shaped cylindrical chambers, each cylindrical chamber contains a cell, the upper cover plate and the lower cover plate are placed on the upper and lower surfaces of the honeycomb structure, respectively, the upper cover plate and the lower cover plate are provided with dense through-holes, the upper chamber is formed between the upper cover plate and the top cover, the lower chamber is formed between the lower cover plate and the bottom of the box, and the coolant circulation component is used to pump the coolant in the lower chamber to the upper chamber.

6 Claims, 7 Drawing Sheets

(51) Int. Cl.
*H01M 10/617* (2014.01)
*H01M 10/633* (2014.01)
*H01M 10/6568* (2014.01)
*H01M 10/658* (2014.01)
*H01M 50/152* (2021.01)
*H01M 50/162* (2021.01)

(58) Field of Classification Search
CPC ........... H01M 10/6568; H01M 10/658; H01M 50/152; H01M 50/162
See application file for complete search history.

(56) References Cited

FOREIGN PATENT DOCUMENTS

| | | | |
|---|---|---|---|
| CN | 112234274 | * | 1/2021 |
| CN | 113540616 | * | 10/2021 |
| CN | 214278617 U | | 10/2021 |
| CN | 215184311 U | | 12/2021 |
| CN | 114094226 A | | 2/2022 |
| CN | 219696548 U | | 9/2023 |
| KR | 2021-0016128 A | | 2/2021 |

OTHER PUBLICATIONS

Chinese Patent No. 210607540U, Issued May 22, 2020 to Feng et al., English translation, pp. 1-15.
Chinese Patent No. 214278617U, Issued Oct. 8, 2021 to Sun et al., English translation, pp. 1-7.
Chinese Patent No. 214184311U, Issued Dec. 14, 2021 to Yang et al., English translation, pp. 1-14.
Chinese Patent No. 219696548U, Issued Sep. 15, 2023 to Hu et al., English translation, pp. 1-10.
Korean Patent No. 2021-0016128 A, Issued Feb. 15, 2021 to Yang Ki-il, English translation, pp. 1-14.

* cited by examiner

Expansion mode 1: Adding heat dissipation fins outside the box

Expansion mode 2: The outer side of the box is close to the liquid cooling plate Expansion mode 3: Pre-embedding direct cooling plate inside the box

HONEYCOMB-IMMERSED HEATING AND COOLING INTEGRATED BATTERY SYSTEM AND THERMAL MANAGEMENT METHOD THEREOF

CROSS REFERENCE TO THE RELATED APPLICATIONS

This application is based upon and claims priority to Chinese Patent Application No. 202410735622.2, filed on Jun. 7, 2024, the entire contents of which are incorporated herein by reference.

TECHNICAL FIELD

The invention relates to the technical field of battery systems, in particular to a honeycomb-immersed heating and cooling integrated battery system and a thermal management method thereof.

BACKGROUND

At present, lithium-ion batteries have become the preferred power battery for electric vehicles, but their performance is significantly affected by ambient temperature, at low temperatures, the available capacity decreases, the power output capacity decreases, and there is a risk of lithium evolution during charging; at high temperatures, the battery life decreases and the risk of thermal runaway increases. Therefore, the importance of battery thermal management has become increasingly prominent. At the same time, with the development of battery systems towards higher energy density, the integration degree of thermal management systems needs to be improved.

Compared with the air-cooled thermal management system using air as the heat transfer medium, the liquid-cooled battery thermal management system using liquid as the heat transfer medium has higher heat transfer efficiency, and has become the mainstream technology of high-performance electric vehicle power battery thermal management. Liquid cooling can be divided into liquid cooling plate cooling (indirect cooling) and immersion cooling (direct cooling). At this stage, the battery liquid cooling plate scheme has been widely used in the electric vehicle industry, which cools or heats the battery by circulating the coolant in the liquid cooling plate. However, the liquid cooling plate scheme has problems such as poor battery temperature uniformity during high-power charging and discharging, slow heating rate at low temperatures, and difficulty in balancing the improvement of cooling capacity and the lightweight of the liquid cooling plate.

Immersion cooling is to directly soak the battery in a dielectric coolant. Compared with indirect liquid cooling, it has the advantages of good thermal uniformity, high cooling efficiency, low energy consumption, compact structure, and reduced risk of thermal runaway. It is the technical development trend of liquid cooling. However, at this stage, submerged cooling has the following problems:

(1) Components such as immersion liquid and immersion tank increase the weight and volume of the battery system, resulting in a decrease in the energy density of the battery system, which is not conducive to improving the driving range of electric vehicles;

(2) Immersion liquid is in direct contact with the battery for a long time, which makes it easy to erode the metal parts and seals inside the battery, resulting in the attenuation of battery life, and it is difficult to meet the long-life requirements of new energy vehicles;

(3) Since the specific heat capacity of the immersion liquid is about 1 to 4 times that of the battery, during the low-temperature heating process of the battery, the liquid heating will significantly increase the heating energy consumption and reduce the heating rate, resulting in the difficulty of low-temperature preheating of the battery.

SUMMARY (1) Technical problems solved: Aiming at the problems of low energy density, low-temperature heating difficulty and long-term immersion damage of the traditional submerged liquid-cooled battery system, the invention provides a honeycomb-immersed heating and cooling integrated battery system and a thermal management method thereof, which solves the problems raised in the above background technology.

(2) In order to achieve the above purpose, the invention is realized by the following technical scheme: a honeycomb-immersed heating and cooling integrated battery system, including a box with a top cover, multiple matrix arranged cells, a honeycomb structure, an upper cover plate, a lower cover plate and a coolant circulation component, the honeycomb structure has multiple hexagonal close-packed special-shaped cylindrical chambers, each cylindrical chamber contains a cell, the upper cover plate and the lower cover plate are placed on the upper and lower surfaces of the honeycomb structure, respectively, the upper cover plate and the lower cover plate are provided with dense through-holes, and an upper chamber is formed between the upper cover plate and the top cover, a lower chamber is formed between the lower cover plate and a bottom of the box, and the coolant circulation component is used to pump the coolant in the lower chamber to the upper chamber.

Preferably, the coolant circulation component includes a liquid pump and hoses set at an inlet end and an outlet end of the liquid pump, a hose outlet of the hose is connected to the upper chamber, and a hose inlet of the hose is connected to the lower chamber.

Preferably, each edge of the cylindrical chamber of the honeycomb structure has multiple vertical flow channels.

Preferably, the through-holes on the upper cover plate and the lower cover plate correspond to the vertical flow channels at the edge of the cylindrical chamber one by one.

Preferably, sizes of the through-holes from near the hose outlet to far away from the hose outlet are gradually increasing.

Preferably, the cell is attached to a heating film.

Preferably, a material of the honeycomb structure, the upper cover plate and the lower cover plate can be glass fiber reinforced flame retardant PA66.

Preferably, the box is provided with a thermistor for detecting temperatures of the cell and the coolant.

A thermal management method for the honeycomb-immersed heating and cooling integrated battery system, including the following processes:

(1) power on, initializing system parameters;
(2) collecting a cell temperature to determine whether the cell temperature is higher than a lower critical temperature, if so, entering process a, otherwise entering process d;

a, determining whether the cell temperature is higher than an upper critical temperature, if so, entering process b, otherwise entering process c;
b, turning on a cooling mode;
c, turning on an insulation mode;
d, turning on a heating mode;
(3) determining whether the battery system stops running, if so, entering process (4), otherwise, returning to process (1);
(4) turning on the insulation mode;
(5) turning off the battery system.

Beneficial Effects

The invention provides a honeycomb-immersed heating and cooling integrated battery system and the thermal management method thereof. It has the following beneficial effects:

The honeycomb-immersed heating and cooling integrated battery system and the thermal management method thereof, the honeycomb structure and the battery constitute a "rifling" vertical flow channel, a large amount of liquid injection is not required in the battery box, it reduces the required coolant volume, and the honeycomb structure uses low-density engineering plastics to improve the energy density of the battery system.

The honeycomb-immersed heating and cooling integrated battery system and the thermal management method thereof, the upper chamber, the lower chamber, the "rifling" vertical flow channel and the battery plus cooling integrated structure cooperate with each other and integrate functions, which can realize the multi-mode switching of low-temperature extreme speed self-heating, chamber gas insulation and immersed cooling and cooling, the thermal management function is good and the system integration is high.

The honeycomb structure adopts high-strength flame retardant materials to improve the mechanical strength and stiffness of the system and prevent the thermal runaway spread of the cell, the lower chamber protects the cell from the bottom impact and avoids the long-term immersion of the cell in the coolant, the battery system has high protective safety performance.

Figure 1:
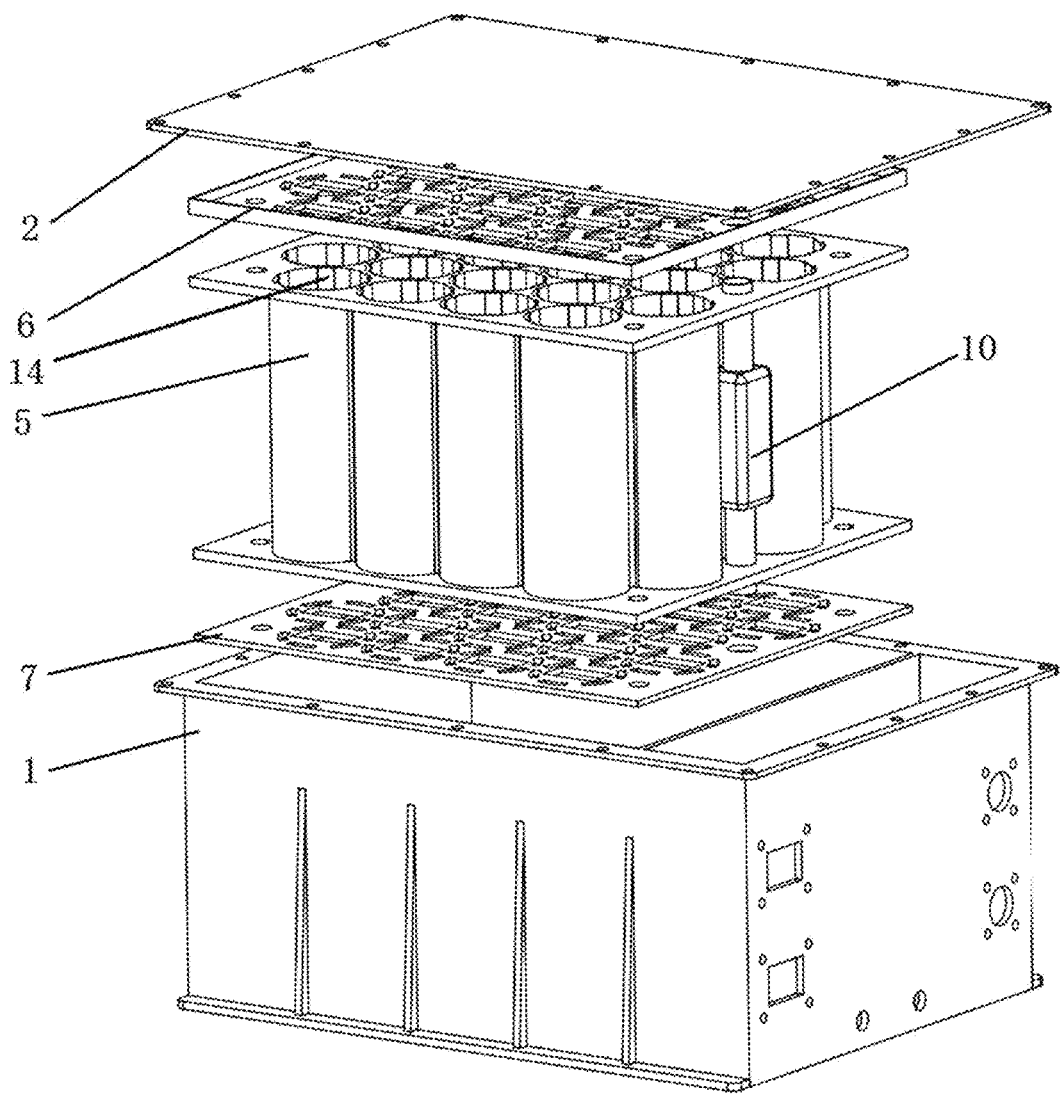
FIG. 1 is an axonometric explosion diagram of the invention.

Marks in the figures: 1 box, 2 top cover, 3 cell, 4 heating film, 5 honeycomb structure, 6 upper cover plate, 7 lower cover plate, 8 upper chamber, 9 lower chamber, 10 liquid pump, 11 hose outlet, 12 hose inlet, 13 through-hole, 14 vertical flow channel.

DETAILED DESCRIPTION OF THE EMBODIMENTS

The embodiment of the invention provides a honeycomb-immersed heating and cooling integrated battery system and the thermal management method thereof, as shown in FIGS. 1-9, including a box 1 with a top cover 2, several matrix-arranged cells 3, a honeycomb structure 5, an upper cover 6, a lower cover 7, and coolant circulation components.

Figure 6:
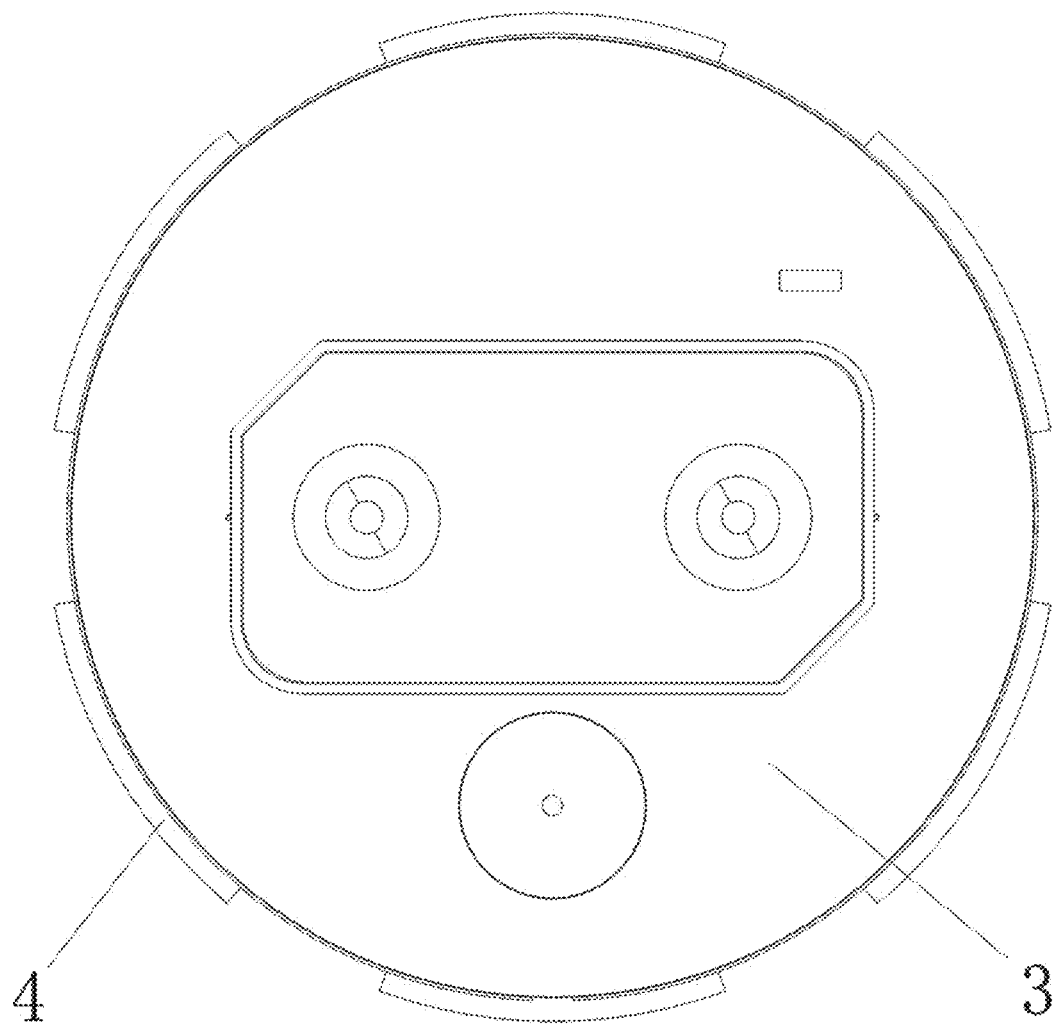
FIG. 6 is a structural diagram of the vertical flow channel of the invention.

As shown in FIG. 6, the heating film 4 is attached to the outside of cell 3. The specific heating film 4 is wound into a cylindrical shape, with thin thickness and high thermal conductivity, which is closely attached to the outer surface of the cylindrical cell 3. The role of heating film 4 is as follows: First, it shortens the heat conduction path between the heat source and the cell 3. In the case of low temperature, there is no need to heat the liquid in the box, and the battery can be directly heated to improve the heating rate and energy efficiency. Secondly, the heating film 4 has good thermal conductivity, which can improve the axial temperature uniformity of cell 3. Third, the thermal conductivity of the heating film 4 is large, and the heat transfer area is large, which helps to heat the internal production of the cell 3 to the coolant during operation, which can improve the cooling performance.

As shown in FIG. 1, the honeycomb structure 5 has multiple hexagonal close-packed special-shaped cylindrical chambers, each cylindrical chamber contains a cell 3, while limiting its movement in the horizontal plane and maintaining fastening. There are several vertical flow channels 14 on the edge of each cylindrical chamber of honeycomb structure 5, which is similar to the rifling structure of the barrel, a margin is left on the side after putting the cell module to form a "rifling" vertical flow channel 14. The vertical channel 14 is used to ensure that the liquid flows smoothly through the surface of the cell 3 to achieve efficient cooling and reduce the required coolant volume.

The vertical flow channel 14 adopts a "rifling" design, which ensures efficient cooling of the liquid flow, and the liquid injection volume is reduced by 85% compared with the 14 without the vertical flow channel.

Figure 2:
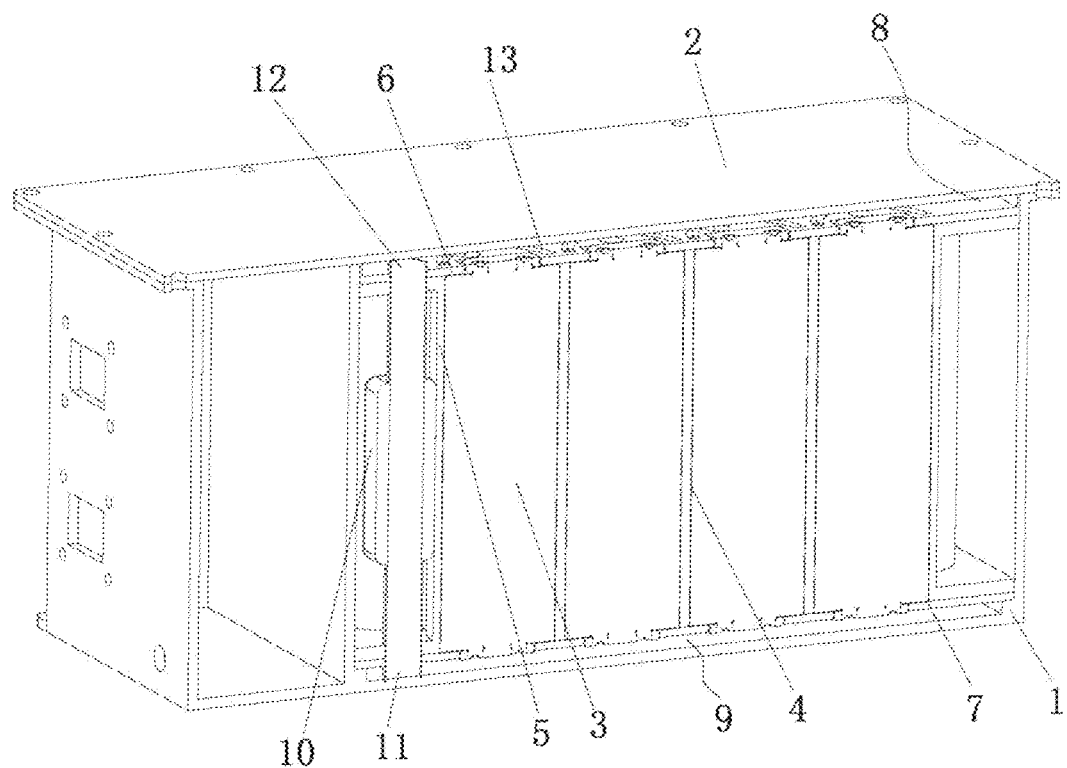
FIG. 2 is a semi-sectional axle measurement of the box of the invention.
Figure 3:
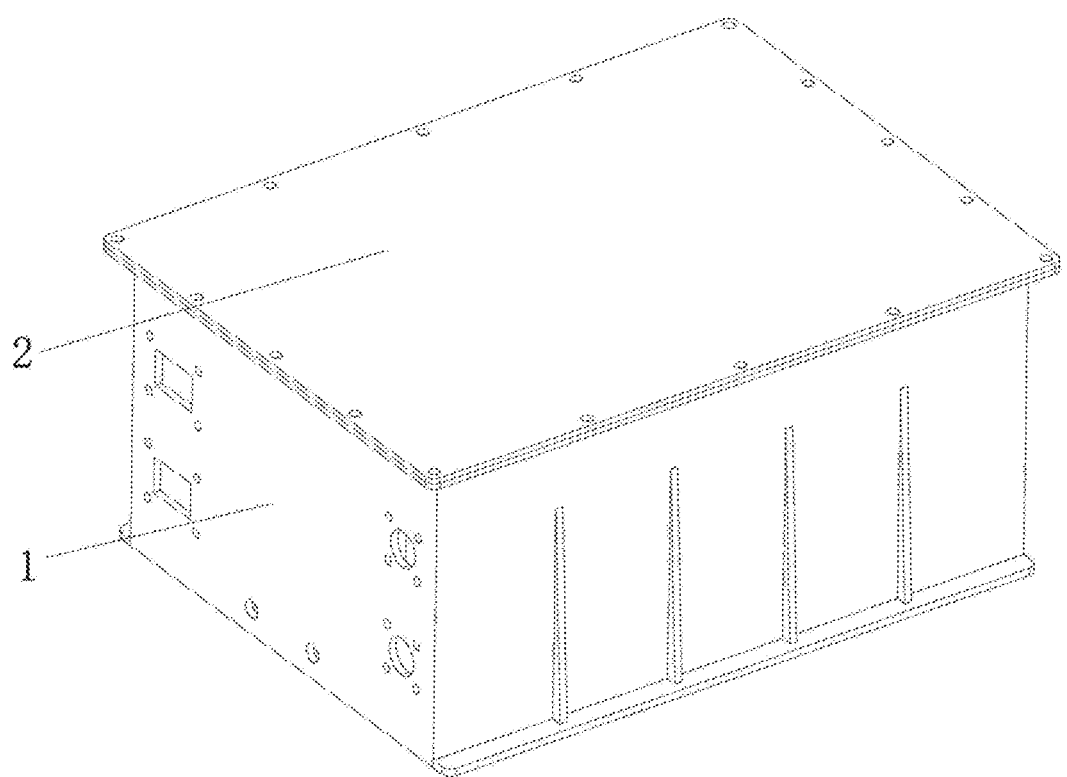
FIG. 3 is an external axle measurement of the box of the invention.

As shown in FIGS. 1-2, the upper cover plate 6 and the lower cover plate 7 are respectively placed on the upper and lower surfaces of the honeycomb structure 5 to limit the vertical displacement of the cell 3, and there are holes in the "rifling" vertical flow channel 14, the cell pressure relief valve and the corresponding position of the cell pole.

Figure 4:
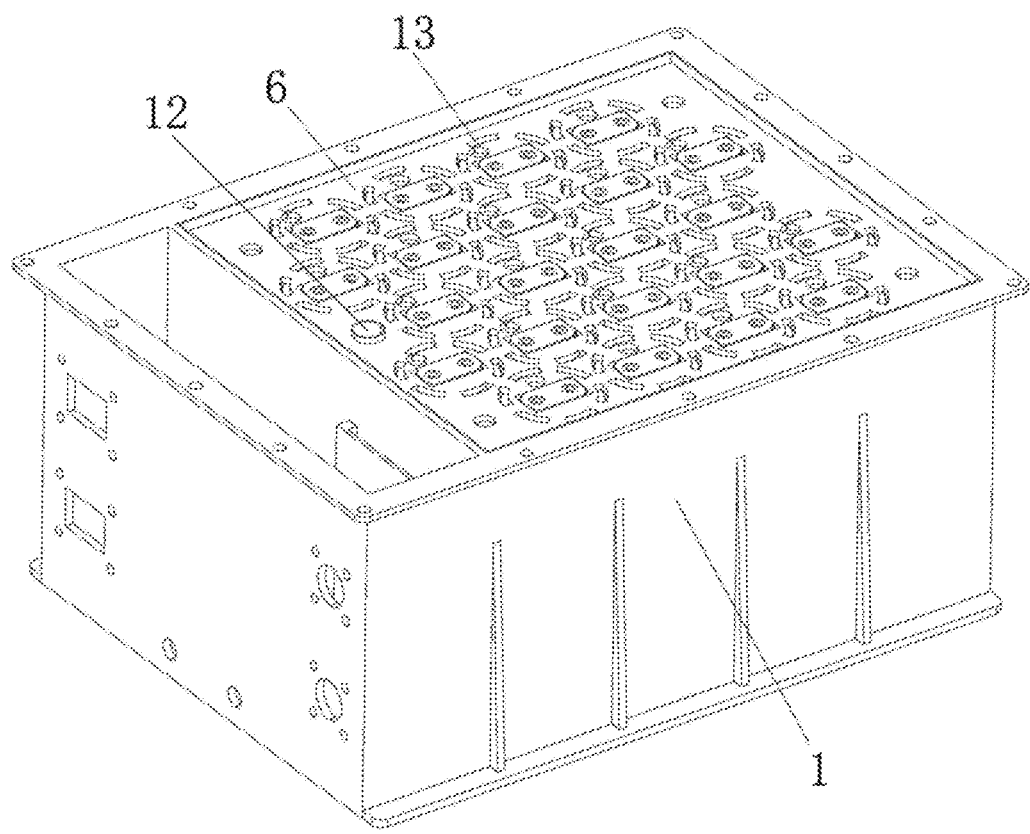
FIG. 4 is a structural diagram of the upper cover plate of the invention.

As shown in FIG. 4, the four sides of the upper cover plate 6 have a retaining structure. Dense through-holes 13 are opened on both the upper cover plate 6 and the lower cover plate 7. The through-holes 13 on the upper cover plate 6 and the lower cover plate 7 correspond to the vertical flow channels 14 at the edge of the cylindrical chamber one by one.

Since the coolant will flow into the through-hole 13 near the hose outlet 11 preferentially, in order to ensure that all the through-holes 13 in the upper chamber 8 can uniformly flow into the nearly equal amount of coolant, as shown in FIG. 4, the hose outlet 11 is set on the side of the upper cover plate 6, and the sizes of the through-holes 13 from near the hose outlet 11 to far away from the hose outlet 11 gradually become larger. The through-hole 13 closest to the hose outlet 11 is the smallest, which is a high flow resistance channel; the through-hole 13 with the farthest distance from the hose outlet 11 is the largest, which is a low flow resistance channel.

Due to the reasonable setting of the above high flow resistance channel and low flow resistance channel, the battery 1C discharges at high temperature, the battery temperature rapidly cools and maintains a reasonable range, and the temperature uniformity is good. According to the finite element simulation, the simulation results of 35° C.: the battery temperature is 15° C., and the temperature uniformity is within 3° C. 45° C. simulation results: the battery temperature is 25° C., and the temperature uniformity is within 5° C.

Figure 5:
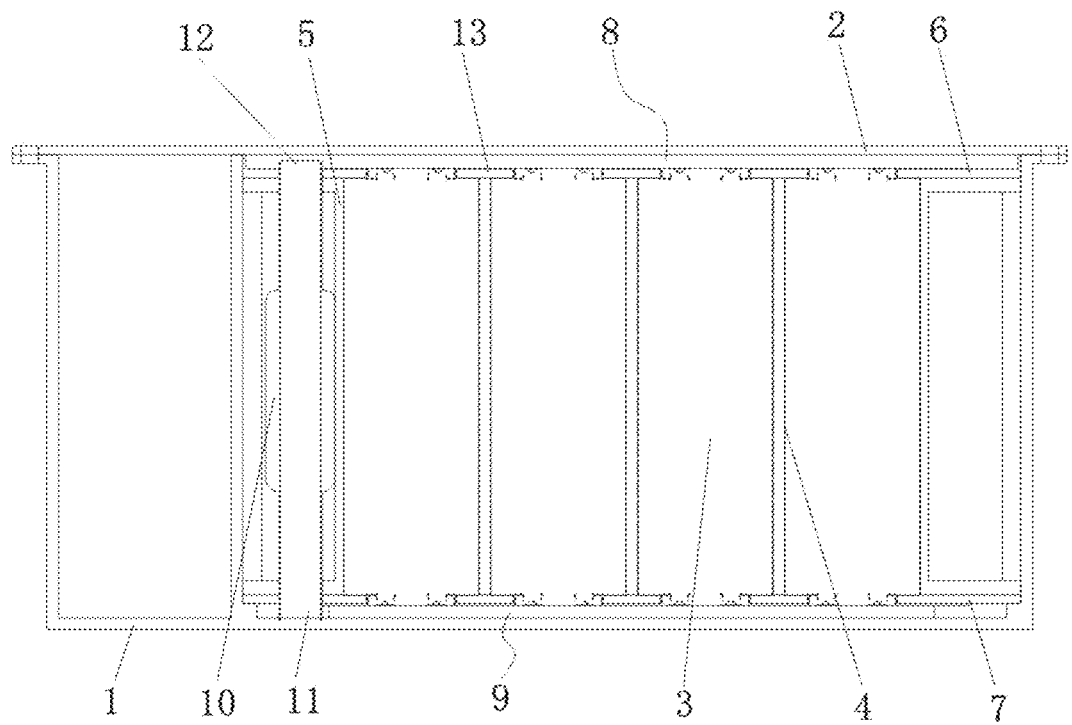
FIG. 5 is a profile of the box of the invention.

As shown in FIG. 5, the upper chamber 8 is formed between the upper cover plate 6 and the top cover 2, the bottom of the module area of the box 1 has a boss, the lower cover plate 7 is placed on the boss, and the lower cover plate 7 supports the honeycomb structure 3, so that the cell 3 is suspended, and there is no direct contact with the bottom of the box 1 to avoid damage to the cell caused by the bottom impact, the lower chamber 9 is formed between the lower cover plate 7 and the bottom of the box 1, which is used to store the coolant without additional liquid storage device.

The coolant circulation component is used to pump the coolant in the lower chamber 9 to the upper chamber 8.

As shown in FIG. 5, the coolant circulation component includes a liquid pump 10 and hoses set at the inlet and outlet of the liquid pump 10. The liquid pump 10 and the hoses are set in a chamber between the honeycomb structure 5 and the box 1, the hose outlet 11 of the hose connects the upper chamber 8, and the hose inlet 12 of the hose connects the lower chamber 9. When cooling the cell, the liquid pump 10 draws the coolant from the lower chamber 9 and fills it into the upper chamber 8, and then takes away the heat through the "rifling" vertical flow channel 14, and the coolant flows into the lower chamber 9 to realize the internal circulation of the cooling liquid. There is an electrical area on one side of the honeycomb structure 5 in the box 1, which is used to place electrical components such as the battery management system. In addition, the two long side walls of the box 1 are equipped with stiffeners, and the short side walls are equipped with through-holes such as total positive and total negative, pressure relief valves and communication interfaces. There are threaded holes on the boss of the box 1, and screw holes are opened at the corresponding positions of the upper cover plate 6, the honeycomb structure 5 and the lower cover plate 7. The above three components can be fastened to box 1 by fixed bolts. There are several fixed holes on the edge of the top cover 2 and the box 1, which can be connected and fastened by bolt nuts.

The material of honeycomb structure 5, upper cover plate 6 and lower cover plate 7 can be glass fiber reinforced flame retardant PA66, the density is 1.4 g/cm$^3$, the flexural strength is 170 MPa, the flexural modulus is 8300 MPa, the flame-retardant grade of UL94-V0, the comparative tracking index (CTI) is 600 V, it has the characteristics of high strength, high rigidity, high heat resistance, low density, good electrical performance and corrosion resistance. Therefore, the honeycomb structure 5 can improve the mechanical strength and stiffness of the battery system, as well as thermal insulation and flame retardant, and prevent the spread of thermal runaway of the cell.

The materials of box 1 and top cover 2 are generally 6061 aluminum alloy, with tensile strength of 230 Mpa and ultimate shear strength of 150 Mpa, the inner wall of box 1 is coated with insulation and corrosion-resistant coating. A corrosion-resistant sealing gasket is arranged between the box 1 and the top cover 2, and between the lower cover plate 7 and the boss of the box 1, which is sealed by a fixed bolt. The connection gap of each component is coated with a sealant to ensure a good seal between the liquid area composed of the lower chamber 9, the upper chamber 8 and the vertical flow channel 14 and the external and electrical areas of the system. The coolant generally uses mineral oil, silicone oil, esters and other high insulation, non-flammable, high flash point, low viscosity, low corrosion, long life, good material compatibility liquid.

A thermistor for detecting the temperature of the cell 3 and coolant is set in the box 1. The thermistor used to detect the temperature of the cell 3 can be set on the outer wall of the cell 3, and the thermistor used to detect the temperature of the coolant can be set in the lower chamber 9.

Figure 7:
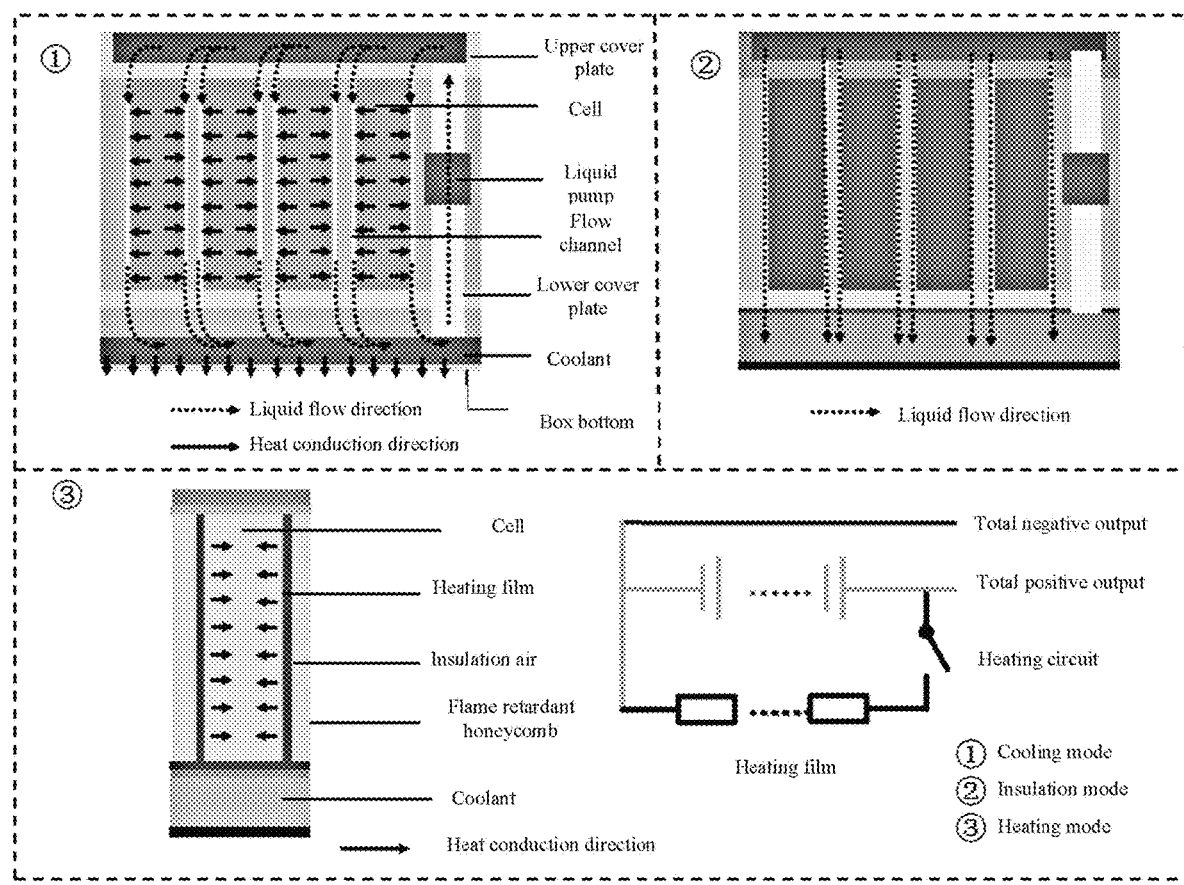
FIG. 7 is a schematic diagram of the thermal management method of the battery system of the invention.
Figure 8:
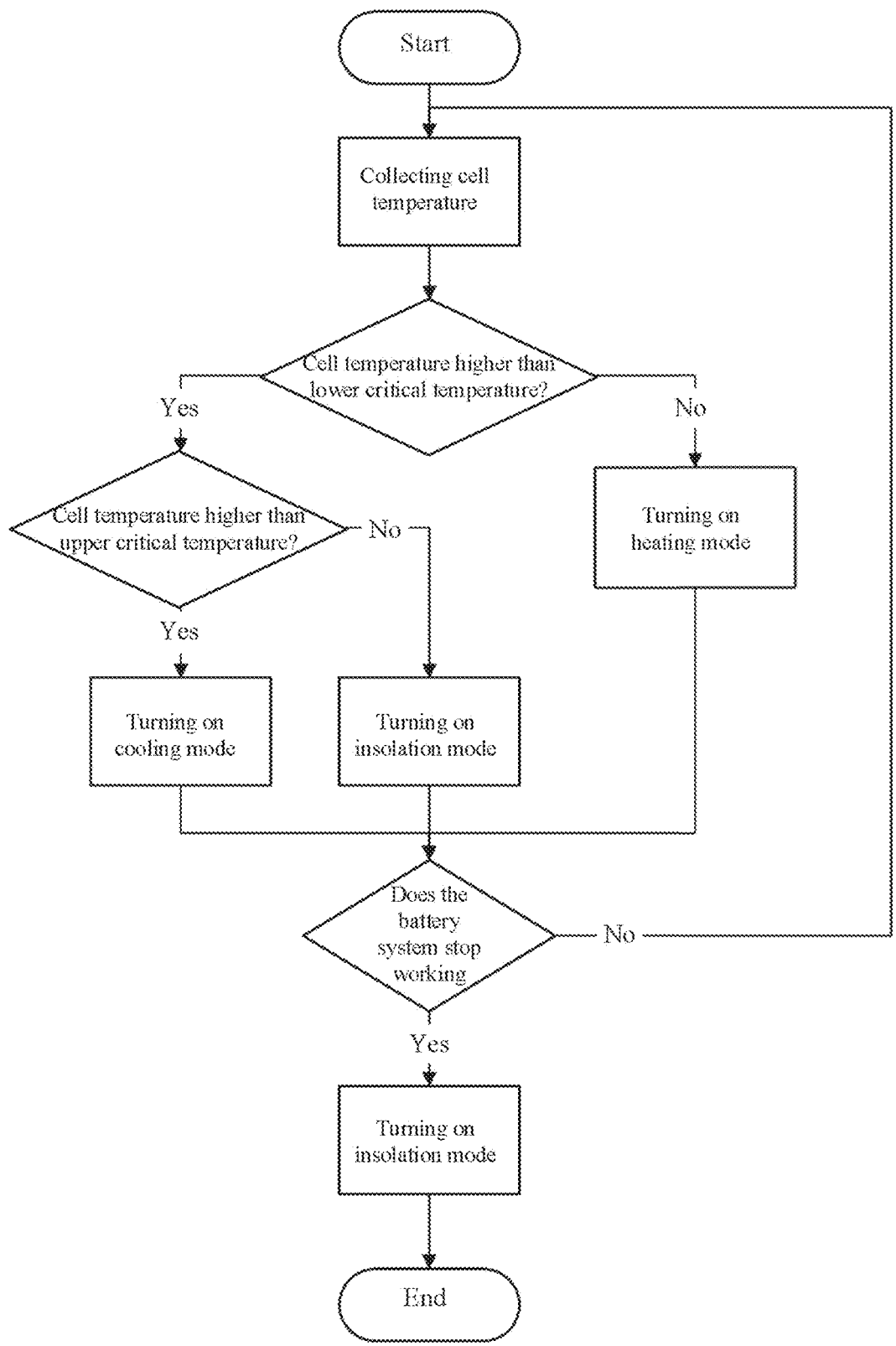
FIG. 8 is a thermal management control flow chart of the battery system of the invention.

As shown in FIG. 7, the thermal management of the battery system is divided into three working modes: cooling mode, insulation mode and heating mode. In the initial state, the coolant is stored in the lower chamber 9. When in the cooling mode, the liquid pump 10 works, the coolant is filled into the upper chamber 8 along the hose, and a certain liquid static pressure is formed. Due to the hydraulic pressure and gravity, the coolant in the upper chamber 8 flows through the "rifling" vertical flow channel 14, directly contacts the surface of the cell, and passes through the forced convection heat exchange zone, the battery heat is finally imported into the lower chamber 9 to complete the internal circulation of the coolant. When standing outdoors at low temperatures, it is necessary to keep the battery warm and store the waste heat of the battery to avoid cold start conditions. In the insulation mode, the battery system stands still, and the coolant flows naturally into the lower chamber 9 due to gravity. At this time, the vertical flow channel 14 is filled with air, and the thermal conductivity is much lower than the coolant, which can play a good thermal insulation effect and reduce the heat loss of the battery. At the same time, because the coolant is stored in the lower chamber 9, there is no direct contact with the cell 3, which can prevent the corrosion damage caused by the cell 3 being immersed in the coolant for a long time. When the system is in the insulation mode, if the battery temperature is low, the heating mode is turned on. In the heating mode, the heating circuit is closed, and the battery directly supplies power to the heating film 4. The heating film 4 covering the surface of the cell 3 generates heat due to the Joule heating effect, and directly heats the battery. Since the coolant is stored in the lower chamber 9, the cell 3 is surrounded by insulation air and flame-retardant honeycomb, and there is no need for heating the coolant in the box, which can increase the heating rate and reduce the heating energy consumption. In the heating mode and cooling mode, the pulse width modulation (PWM) can be used to control the power of the liquid pump and the heating film through control algorithms such as rule control, PID control and optimal control, so as to achieve more efficient battery thermal management. The following is the thermal management method based on the above three working modes of cooling mode, insulation mode and heating mode:

As shown in FIG. 8, the thermal management method of the battery system includes the following processes:
  (1) power on, initializing system parameters;
  (2) collecting the cell temperature to determine whether the cell temperature is higher than a lower critical temperature, if so, entering process a, otherwise entering process d;
  a, determining whether the cell temperature is higher than an upper critical temperature, if so, entering process b, otherwise entering process c;
  b, turning on the cooling mode;
  c, turning on the insulation mode;
  d, turning on the heating mode;

(3) determining whether the battery system stops running, if so, entering process (4), otherwise, returning to process (1);
(4) turning on the insulation mode;
(5) turning off the battery system.

Application Examples

At present, the power battery system of electric vehicles generally adopts the thermal management scheme based on the liquid cooling plate, which realizes the cooling and heating of the battery through the indirect contact between the coolant and the cell. Due to the increasing demand for fast charging, low-temperature cold start, low-temperature endurance and long-term high-load operation of electric vehicles, the existing liquid-cooled plate scheme cannot meet the needs of battery thermal management. Therefore, the honeycomb-immersed heating and cooling integrated battery system described in the invention can be used. Firstly, the honeycomb-immersed heating and cooling integrated battery system can achieve efficient thermal management of multi-mode switching, which can meet the thermal management requirements of electric vehicles in a wide temperature range and multiple working conditions. Secondly, the honeycomb-immersed heating and cooling integrated battery system has a high safety protection ability, which can improve the safety of electric vehicles and protect the life and property safety of drivers and passengers. Third, the honeycomb-immersed heating and cooling integrated battery system has high system integration and high energy density, which can improve the driving range of the vehicle.

Figure 9:
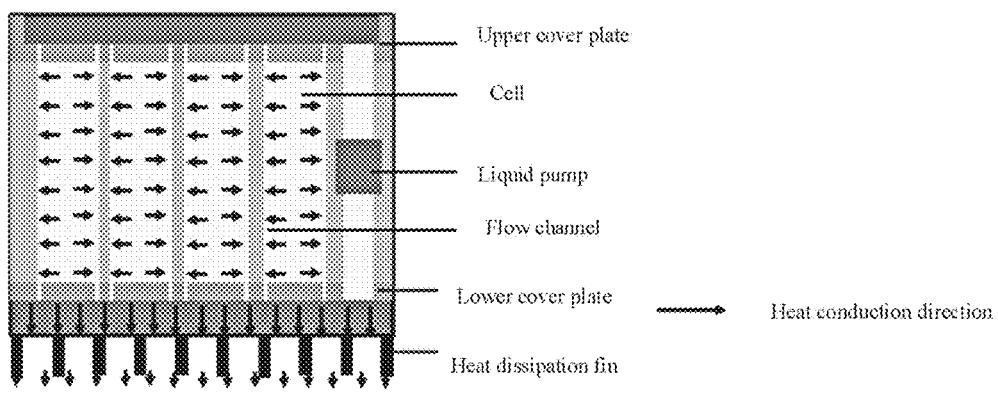
FIG. 9 is a schematic diagram of the thermal management expansion mode of the battery system of the invention.
Figure 9:
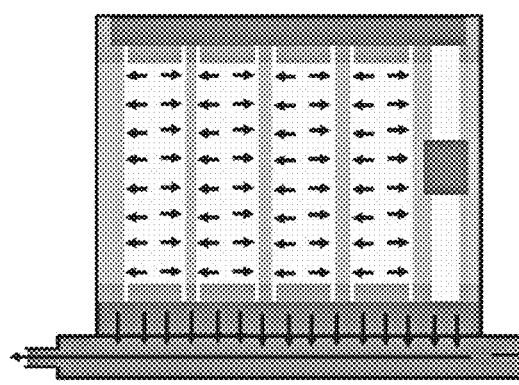
Figure 9:
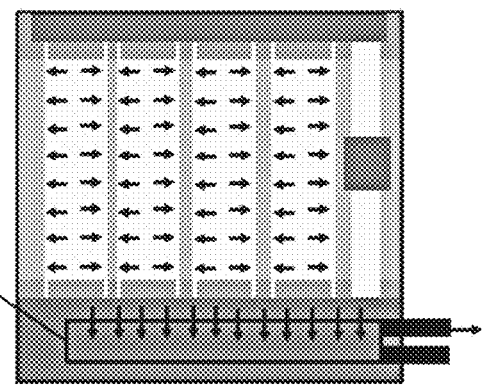

As shown in FIG. 9, the honeycomb-immersed heating and cooling integrated battery system has high expansibility of vehicle thermal management. It can be flexibly expanded with vehicle thermal management according to demand, adding cooling fins or liquid cooling plates outside the box, or embedding direct cooling plates inside the box to achieve a better cooling effect.

The honeycomb-immersed heating and cooling integrated battery system and the thermal management method thereof described in this invention can be applied to electric vertical take-off and landing aircraft (eVTOL, i.e. electric flying vehicles). Electric flying vehicles can change urban traffic from plane to three-dimensional, and realize major changes in travel modes. However, compared with electric vehicles, electric flying vehicles have different operating characteristics, such as large continuous and peak power, concentrated operating periods, and high fast charging frequency, which have extremely high requirements for fast charging capacity and cycle life of battery systems. The existing battery system and thermal management method cannot meet its thermal control requirements, so the honeycomb-immersed heating and cooling integrated battery system described in the invention can be used. First, before the battery is quickly charged, the honeycomb-immersed heating and cooling integrated battery system turns on the heating mode, quickly heats the battery to a temperature that meets the requirements of fast charging, and avoids lithium precipitation. After starting the fast charge, the cooling mode is turned on, and the battery temperature is accurately controlled by adjusting the flow rate to avoid exceeding the allowable operating temperature of the battery. Second, when the battery has high power output, the honeycomb-immersed heating and cooling integrated battery system turns on the cooling mode, efficiently cools the battery, and avoids material attenuation caused by high temperature. Thirdly, the honeycomb-immersed heating and cooling integrated battery system has high safety protection ability, the honeycomb structure can isolate the heat spread, avoid the occurrence of thermal runaway of the whole battery pack, and meet the requirements of the flying vehicles for battery safety.

Although the embodiments of the invention have been shown and described, it is understandable to ordinary technicians in the field that these embodiments can be varied, modified, replaced and modified without departing from the principles and spirit of the invention, and the scope of the invention is limited by the accompanying claims and their equivalents.

What is claimed is:

1. A thermal management method of a honeycomb-immersed heating and cooling integrated battery system, wherein the honeycomb-immersed heating and cooling integrated battery system comprises a box with a top cover, multiple matrix arranged cells, a honeycomb structure, an upper cover plate, a lower cover plate and a coolant circulation component, wherein the honeycomb structure has multiple hexagonal close-packed cylindrical chambers, each cylindrical chamber contains a cell, the upper cover plate and the lower cover plate are placed on upper and lower surfaces of the honeycomb structure, respectively, the upper cover plate and the lower cover plate are provided with through-holes, and an upper chamber is formed between the upper cover plate and the top cover, a lower chamber is formed between the lower cover plate and a bottom of the box, and the coolant circulation component is configured to pump a coolant in the lower chamber to the upper chamber; the coolant circulation component comprises a liquid pump and a hose arranged at an inlet end and an outlet end of the liquid pump, a hose outlet of the hose is connected to the upper chamber, and a hose inlet of the hose is connected to the lower chamber; and each edge of the cylindrical chamber of the honeycomb structure has multiple vertical flow channels;

wherein the thermal management method comprises the following processes:
(1) powering on, and initializing system parameters, wherein in an initial state, the coolant is stored in the lower chamber;
(2) collecting a cell temperature to determine whether the cell temperature is higher than a lower critical temperature, if so, entering process a, otherwise entering process d;
   a, determining whether the cell temperature is higher than an upper critical temperature, if so, entering process b, otherwise entering process c;
   b, turning on a cooling mode; wherein when in the cooling mode, the liquid pump works, the coolant is filled into the upper chamber along the hose, and a certain liquid static pressure is formed; due to a hydraulic pressure and gravity, the coolant in the upper chamber flows through a "rifling" vertical flow channel, directly contacts a surface of the cell, and passes through a forced convection heat exchange zone, a battery heat is finally imported into the lower chamber to complete an internal circulation of the coolant; and
   c, turning on an insulation mode; wherein when in the insulation mode, the honeycomb-immersed heating and cooling integrated battery system stands still, and the coolant flows naturally into the lower chamber due to gravity; at this time, the vertical flow channel is filled with air, and a thermal conductivity is lower than the coolant, wherein a good thermal insulation effect is realized and a heat loss of a battery is reduced;

d, turning on a heating mode; wherein when in the heating mode, a heating circuit is closed, and the battery directly supplies power to a heating film, the heating film covering the surface of the cell generates heat due to a Joule heating effect, and directly heats the battery; since the coolant is stored in the lower chamber, the cell is surrounded by insulation air and flame retardant honeycomb, and there is no need for heating the coolant in the box, wherein a heating rate is increased and a heating energy consumption is reduced;

(3) determining whether the honeycomb-immersed heating and cooling integrated battery system stops running, if so, entering process (4), otherwise, returning to process (1);

(4) turning on the insulation mode; and (5) turning off the honeycomb-immersed heating and cooling integrated battery system.

2. The thermal management method of the honeycomb-immersed heating and cooling integrated battery system according to claim 1, wherein the through-holes on the upper cover plate and the lower cover plate correspond to the vertical flow channels at the edge of the cylindrical chamber one by one.

3. The thermal management method of the honeycomb-immersed heating and cooling integrated battery system according to claim 2, wherein sizes of the through-holes from near the hose outlet to far away from the hose outlet are gradually increasing.

4. The thermal management method of the honeycomb-immersed heating and cooling integrated battery system according to claim 1, wherein each cell is attached to the heating film.

5. The thermal management method of the honeycomb-immersed heating and cooling integrated battery system according to claim 1, wherein a material of the honeycomb structure, the upper cover plate and the lower cover plate is glass fiber reinforced flame retardant.

6. The thermal management method of the honeycomb-immersed heating and cooling integrated battery system according to claim 1, wherein the box is provided with a thermistor for detecting temperatures of the cell and the coolant.

* * * * *